United States Patent Office 3,518,260
Patented June 30, 1970

3,518,260
METHOD FOR PREPARING AMINOACYL CEPHALOSPORINS
John L. Spencer and Charles W. Ryan, Indianapolis, Ind., assignors to Eli Lilly and Company, Indianapolis, Ind., a corporation of Indiana
No Drawing. Filed Mar. 8, 1965, Ser. No. 438,046
Int. Cl. C07d 99/24
U.S. Cl. 260—243                              10 Claims

ABSTRACT OF THE DISCLOSURE 7-aminoacyl cephalosporins are prepared by reacting 7-aminocephalosporanic acid with an aminoacylating agent in which the amino group of the aminoacylating agent has been protected by reaction with a β-dicarbonyl compound, then hydrolytically cleaving the protecting group from the reaction product. The 7-aminoacyl cephalosporins are effective antibiotics.

---

This invention relates to the preparation of certain antibiotic substances.

This invention provides a novel method for producing certain cephalosporanic acid derivatives, particularly those derivatives with an aminoacylamido linkage in the 7 position on the cephalosporin nucleus, which demonstrate unexpected activity against gram-negative as well as against gram-positive bacteria. These antibiotic compounds can be represented by the formula:

$$R^3-(CH_2)_m-\underset{R^4}{\underset{|}{C}}(NH_2)-(CH_2)_n-\overset{O}{\overset{\|}{C}}-NH-CH-HC\diagdown\overset{S}{\diagup}CH_2$$
(with cephalosporin ring: $O=C-N$, $C-CH_2-R^1$, $C-R^2$)

I in which:
$R^1$ is acetoxy or pyridino;
$R^2$ is OH when $R^1$ is acetoxy;
$R^2$ is O⁻ when $R^1$ is pyridino;
$R^3$ is $C_1-C_4$ alkyl, $C_3-C_6$ cycloalkyl, phenyl, naphthyl, thienyl, benzothienyl, furyl, benzofuryl, indolyl, or pyridyl;
$R^4$ is hydrogen, methyl, or ethyl; and
$m$ and $n$ are 0 or 1.

Compounds of the above description have been heretofore prepared by the reaction of the appropriate cephalosporin nucleus with an acylating agent comprising the appropriate aminoacyl moiety, whereby the derived aminoacyl structure was attached to the 7-amino group. In order for this reaction to be carried out successfully, it was necessary to protect the aminoacyl moiety at the amino function with a protecting group in such a way as to prevent a side reaction from occurring between two or more of these aminoacyl groups, which would produce a mixture of the desired aminoacyl cephalosporin with other di-, tri-, and polypeptides. It was necessary also for the protecting group to be removable quantitatively, after acylation had been carried out, without degrading the other desired portions of the molecule.

To accomplish this purpose, many protecting groups have been devised by prior workers. Examples of those groups include carbobenzoxy, carbo-tert.-butoxy, carboallyloxy, trityl, and the like. These are more or less successful generally, but when applied to the reaction used to prepare the defined aminoacyl cephalosporins, they lead to a rather poor yield of difficultly separable products.

The present invention affords a novel method for the preparation of the aminoacyl cephalosporins, in which an aminoacylating agent, protected on the amino moiety by reaction with a β-dicarbonyl compound, as hereinafter defined, is reacted with the cephalosporin nucleus. The N′-protected aminoacyl cephalosporin thus formed is then treated in a known manner to remove the protecting group, thus yielding the desired end product.

By means of the invention, substantially pure aminoacyl cephalosporins of the defined class can be obtained in improved yield on a large scale, without need for isolation and purification of any intermediate materials. The novel intermediates obtained in the course of carrying out this process can, however, be isolated and purified, if desired, and thus form a part of the invention.

In accordance with the present invention, the protected amino acid can be represented by the formulas:

$$R^3-(CH_2)_m-\underset{R^4}{\underset{|}{C}}-(CH_2)_n-\overset{O}{\overset{\|}{C}}-OH$$
II(a)

$$R^3-(CH_2)_m-\underset{R^4}{\underset{|}{C}}-(CH_2)_n-\overset{O}{\overset{\|}{C}}-OH$$
II(b)

wherein
$R^3$, $R^4$, $m$ and $n$ are as hereinabove defined;
$R^5$, taken alone, is hydrogen, lower alkyl, or phenyl;
$R^6$, taken alone, is hydrogen, lower alkyl, phenyl-substituted lower alkyl, or phenyl;
$R^7$, taken alone, is hydrogen, lower alkyl, lower alkoxy, or phenyl;
$R^6$ and $R^7$, when taken together with the carbon atoms to which they are attached, complete a carbocyclic ring having the structure of benzene or naphthalene; and
$R^5$ and $R^7$, when taken together with the interconnecting carbon atoms, complete a $C_5-C_7$ cycloaliphatic ring.

Formulas II(a) and II(b), above, demonstrate two different electronic representations of the hybrid system as defined for the structure by Dane et al., Angew. Chem., 74, 873 (1962). It is well known that structural formulas cannot represent the true picture of the resonant hybrid. The presence of resonance stabilization through some other portion of the molecule will, of course, allow the structure to be represented more precisely by one of the formulas, although the molecule will exist at all times in a hybrid form represented in part by the other structural formula. It will be seen that when $R^6$ and $R^7$ form a ring with resonance stabilization, structure II(b) will more nearly represent the predominating species. When $R^6$ and $R^7$ do not form such a ring, it is believed that the structure of the compound is more nearly represented by II(a). For example, when $R^6$, taken together with $R^7$ and the carbon atoms to which they are respectively attached, form benzene, the preferred structural representation would be:

whereas when $R^6$ and $R^7$ are methyl, the preferred species is thought to be represented more correctly by:

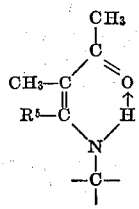

It should be understood, however, that the true species cannot be accurately represented by a single structure, but only by a hybrid of the written structures. For the sake of simplicity, the formula of the compound defined by either II(a) or II(b), or a hybrid structure thereof, will be written as the structure obtained from a noncyclic di-ketone II(a), although it is to be understood this is not a limiting notation.

The reaction of the invention proceeds through the formation of a novel intermediate of the general formula:

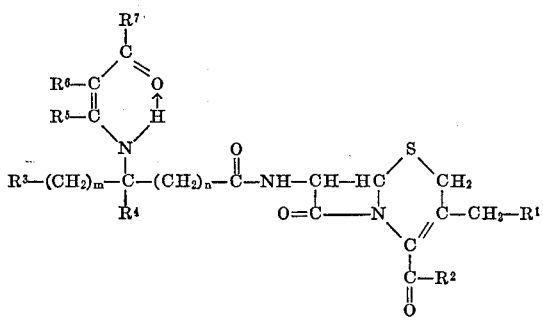

wherein $m$, $n$, and the various substituent groups are as hereinabove defined.

This intermediate can be isolated and purified by known methods, as illustrated hereinafter.

"Lower alkyl" and "$C_1$–$C_4$ alkyl," when used herein, include methyl, ethyl, n-propyl, isopropyl, n-butyl, isobutyl, sec.-butyl, and tert.-butyl.

"Lower alkoxy" includes methoxy, ethoxy, n-propoxy, isopropoxy, n-butoxy, isobutoxy, sec.-butoxy, and tert.-butoxy.

"$C_3$–$C_6$ cycloalkyl" includes cyclopropyl, cyclobutyl, cyclopentyl, and cyclohexyl.

The compounds wherein $R^5$ and $R^7$, taken together with the interconnecting carbon atoms, complete a $C_5$–$C_7$ cycloaliphatic ring are prepared from such cyclic structures as 1,3-cyclopentanedione, 1,3-cyclohexanedione, 5,5 - dimethyl - 1,3 - cyclohexanedione, 1,3-cycloheptanedione, and the like.

In naming the novel compounds provided by the process of the invention, it is convenient to designate the basic, saturated, fused-ring, β-lactam thiazine structure as "cephem," IV,

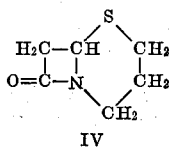

and to name the compounds as derivatives thereof, the term "cephem" referring to the basic structure with a single olefinic bond. According to this system, cephalosporin C would be named 3-acetoxy-methyl-7-(5′-amino-adipamido)-3-cephem-4-carboxylic acid, and the compounds provided by the process of this invention would be named as 3 - acetoxymethyl - 7 - aminoacylamido - 3 - cephem-4-carboxylic acids, or more conveniently, 7-aminoacylamidocephalosporanic acids; and 3 - pyridinomethyl-7-aminoacylamido-3-cephem-4-carboxylic acids.

While the compounds provided by the process of the present invention have been defined in terms of a structural formula which depicts the structural features of the intermediate and product compounds and which indicates the presence therein of certain well-known organic radicals, including alkyl, cycloalkyl, phenyl, thienyl, benzothienyl, furyl, and benzofuryl, indolyl and pyridyl, it will be recognized by those skilled in the art that such radicals may bear one or more substituents without requiring any significant modification of the process of the invention. The preparation of compounds bearing such substituents is accordingly to be considered to lie within the scope of the invention. Among such substituent atoms and radicals are halo, hydroxy, nitro, lower alkyl, trifluoromethyl, methoxy, methylmercapto, cyano, hydroxymethyl, β-hydroxyethyl, acetyl, acetamido, and the like.

The protected amino acids which ultimately form the substituent at position 7 of the cephalosporin nucleus are conveniently prepared by condensing an appropriately substituted amino acid, as the salt thereof, with a β-diketone, β-ketoester, or other β-dioxo-compound, one method of effecting such a condensation being that described by Dane et al., supra. Either optical isomer of the amino acid, or the racemic mixture, may be employed.

Examples of β-dicarbonyl-compounds which can be used to condense with the amine function of the amino acid include acetylacetone, formylacetone (as an alkali metal salt), propionylacetone, butyrylacetone, isobutyrylacetone, 3,5 - diketo-2,6 - dimethylheptane, acetylacetophenone, benzoylbenzophenone, 3-methyl-2,4-diketopentane, 3-phenyl-2,4-diketopentane, α-acetylpropiophenone, α-benzoylpropiophenone, 3-(β-phenethyl)-2,4-diketopentane, salicylaldehyde, 2-hydroxy-1-naphthaldehyde, 2-hydroxyacetophenone, 2-hydroxypropiophenone, and the like.

The thus prepared N-protected amino carboxylic acid can be caused to react with the cephalosporin nuclei if the acid is first converted into a mixed anhydride, suitably by reacting the protected acid, or a salt thereof, in a nonaqueous, nonhydroxylic, water-miscible solvent with an alkyl chlorocarbonate such as ethyl chlorocarbonate, isobutyl chlorocarbonate, benzyl chlorocarbonate, p-methoxybenzyl chlorocarbonate, adamantyl chlorocarbonate, and the like. The reaction is carried out at or below ambient room temperature. Suitable solvents in which to carry out this reaction include acetone, methyl ethyl ketone, dioxane, tetrahydrofuran, acetonitrile, ethyl acetate, dimethylacetamide, and the like.

Alternatively, the protected amino carboxylic acid can be used directly in conjunction with an equimolar proportion or more of a carbodiimide to acylate the 7-amino group. In this method, the acylation proceeds at ordinary temperatures. Any of the carbodiimides are effective for this purpose, the active moiety being the —N=C=N— structure. Illustrative examples include N,N′-diethylcarbodiimide, N,N′-di-n-propylcarbodiimide, N,N′-diisopropylcarbodiimide, N,N′ - dicyclohexylcarbodiimide, N,N′ - diallylcarbodiimide, N,N′ - bis(p-dimethylaminophenyl)carbodiimide, N-ethyl-N′-(4″-ethyl-2″-oxazinyl) carbodiimide, and the like, other suitable carbodiimides being disclosed by Sheehan in U.S. Pat. No. 2,938,892 (May 31, 1960) and by Hofman et al. U.S. Pat. No. 3,065,224 (Nov. 20, 1962).

As a further alternative, an equimolar proportion or more of carbonyl diimidazole can be used in the acylation procedure to activate the reaction with the protected amino carboxylic acid.

The resulting N′-protected aminoacyl cephalosporanic acid may be isolated in the form of its acid or may be converted, by known methods, to a salt with a pharmaceutically acceptable cation.

For the purpose of illustration, there can be mentioned several types of cationic salts which can be prepared from said compounds, including for example, water soluble salts as the sodium, potassium, ammonium, and substituted amonium salts, as well as less water soluble salts such as the calcium, barium, procaine, quinine, and dibenzylethylenediamine salts.

The hydrolysis of the N'-protected cephalosporanic acid derivative is carried out in aqueous solution, acidified to below about pH 5, preferably around pH 2, and at ambient room temperature. In a preferred embodiment, the hydrolysis is effected by adding a small quantity of an aqueous solution of a strong acid to a solution of the N'-protected cephalosporanic acid, or a salt thereof, dissolved or suspended in water, an organic solvent, or mixture thereof. Suitable acids include hydrochloric acid, hydrobromic acid, hydriodic acid, formic acid, trifluoroacetic acid, and the like.

Enhanced yields of the cephalosporanic acid product can be obtained by reacting 7-aminocephalosporanic acid with a mixed anhydride prepared by the reaction of a tertiary amine salt of the N'-protected aminocarboxylic acid, or an alkali metal salt thereof in the presence of a small quantity of a tertiary amine.

"Tertiary amine" as used herein refers to any tertiary amine of ionic strength great enough to form an ionic bond with the acid function of the amino acid reactant; it may include trimethylamine, triethylamine, N-methyldiallylamine, N-methoxymethyldimethylamine, N,N,N', N'-tetramethylethylenediamine, dimethylbenzylamine, diethylbenzylamine, N-methylmorpholine, N-ethylmorpholine, and the like.

"Alkali metal" refers to sodium, potassium, or the like.

The process afforded by this invention can illustratively be carried out in the following manner:

The amino carboxylic acid in the form of its anionic salt, protected on the basic primary nitrogen by reaction with a β-dicarbonyl-compound, is dissolved at ambient temperatures in an anhydrous, nonhydroxylic, water-miscible, organic solvent. If the salt is any other than an amine salt, a catalytic amount of an amine (such as dimethylbenzylamine) is added and the solution is cooled to about 0 to —10° C. or lower if desired. As the solution is stirred, an alkyl chlorocarbonate is added in at least about equimolar ratio to the amino acid. The solution thus formed is stirred for the length of time necessary for the intermediate anhydride to be formed. To the resulting intermediate is then added an aqueous solution of 7-aminocephalosporanic acid in the form of an amine salt, which can be prepared by dissolving 7-aminocephalosporanic acid in water with trimethylamine, triethylamine, dimethylethylamine, di-n-propylamine, di-isopropylamine, or the like.

The whole mixture is stirred at or below ambient room temperature and allowed to react for about one hour, after which it can be filtered to remove solid by-products and/or evaporated to a smaller volume if desired.

It is at this point that the N'-protected cephalosporanic acid can be isolated. One method of isolation is to overlayer the aqueous solution with a non-miscible organic solvent capable of extracting the desired product therefrom, then to acidify to about pH 3, separate the organic layer and isolate the desired product therefrom, as by precipitation or crystallizing via addition of a diluent liquid, for example, ether or petroleum ether, in which the product is insoluble. Alternatively, the nonaqueous solution can be evaporated to dryness and the desired product purified by crystallization of the residue.

Removal of the amine protecting group is readily accomplished hydrolytically by addition of mineral acid or strong organic acid to about pH 2, and allowing the solution to stir at ambient room temperature until crystallization has begun, then cooling. After crystallization has reached substantial completion, the solid 7-aminoacyl-amidocephalosporanic acid is removed by filtration, washed, and dried.

For a better understanding, the process of the present invention may be illustrated by the following specific examples, which, however, are not intended to limit the invention by their embodiment of only certain of the features thereof.

EXAMPLE 1

D-α-phenylglycine, 10.419 kg., was slurried in 45 liters of benzene. An aqueous 50 percent sodium hydroxide solution prepared from 2760 g. of sodium hydroxide (minimum assay 90 percent) and 2760 g. of water was added and thoroughly mixed with the benzene slurry. The mixture was heated with stirring to 50–60° C. for one to two hours. Methyl acetoacetate, 8.0 kg., was added (using 3.8 liters of benzene wash) to the hot mixture. The mixture was distilled until free of water, and the resulting benzene slurry of the solid product was cooled to 25° C. and filtered. The resulting salt was washed with benzene and heated to 60° C. for four hours. Yield: 16 kg. (85 percent) of methyl 3-(α-carboxybenzylamino)crotonate as the sodium salt.

A solution containing 150 g. of the above sodium salt was prepared using 1.680 ml. of acetonitrile and 1.2 ml. of dimethylbenzylamine. This solution was cooled to —10° C., and 72 g. of ethyl chlorocarbonate were added in one portion. Stirring was continued for 20 minutes at —10° C. A solution of 151 g. of 7-aminocephalosporanic acid and 81.6 g. triethylamine in 720 g. of water was added in one portion, and the mixture stirred for one hour at 0° C. The resulting mixture was filtered and the filtrate evaporated in vacuo to a volume of about 960 ml. To this solution were added 1800 ml. of methyl isobutyl ketone and 240 ml. of formic acid (98–100 percent). This mixture was allowed to stir at about 0° C. until crystallization was complete. The product was removed by filtration and washed by slurrying successively with 300 ml. of 3:2 methyl isobutyl ketone-water, twice with 150 ml. of water, and twice with 150 ml. of methyl isobutyl ketone. Yield: 50–57 g. (22–25 percent).

EXAMPLE 2

To a solution of 11 g. (0.2 mole) of potassium hydroxide in 200 ml. of methanol were added 30.0 g. (0.2 mole) of D-phenylglycine. With stirring, 40.0 ml. (0.4 mole) of acetylacetone were added slowly. A thick white precipitate formed immediately. After three hours a lesser amount of precipitate seemed to be present. The mixture was cooled and filtered, and the residue was washed with a small amount of methanol and air-dried. This material (7.0 g.) was identified as D-phenylglycine and was subsequently discarded.

The filtrate was concentrated in vacuo to dryness and the resulting residue was dissolved in benzene. Addition of a large amount of petroleum ether (boiling range 60–90° C.) yielded a gelatinous precipitate which was collected and dried in vacuo. Yield: 28.0 g. of potassium D-N-[2-(4-keto-2-pentenyl)]phenylglycine. A suspension of 3.5 g. of this solid in 50 ml. of tetrahydrofuran was stirred at —10° C. and 1.78 ml. of isobutyl chloroformate were added slowly. The temperature was maintained at —10° C. for one hour. A solution of 3.5 g. of 7-aminocephalosporanic acid in 25.0 ml. of tetrahydrofuran, 25.0 ml. of water, and 1.78 ml. of triethylamine was added slowly. The mixture was stirred at 0° to —10° C. for one hour and at room temperature for one hour, then diluted with 100 ml. of water and extracted with 2× 100 ml. of ethyl acetate. The aqueous layer was cooled in an ice bath, overlayered with ethyl acetate, and adjusted to pH 3.0 with 10 percent hydrochloric acid. The layers were separated and the organic layer was dried and concentrated in vacuo to dryness. The residue was treated with a mixture of 20 ml. of ether and 60 ml. of petroleum ether (boiling range: 30–60° C.) to crystallize the 7-(D-α-N[2-(4-keto - 2 - pentenyl)]aminophenylacetamido)cephalosporic acid, which was collected and vacuum-dried. Yield: 1.9 g. (30 percent).

EXAMPLE 3

A suspension of 15.1 g. (0.1 mole) of D-phenylglycine and 4.0 g. (0.1 mole) of sodium hydroxide in 300 ml. of ethanol was refluxed several minutes, with stirring, to convert the acid to the sodium salt. The mixture was cooled to room temperature, 10.8 ml. of methyl acetoacetate were added, and the mixture was heated under reflux for two hours. The solution was concentrated in vacuo to approximately 100 ml. and cooled to yield 7.5 g. of N-(1-methoxycarbonyl - 1 - propen-2-yl)-D-phenylglycine as the sodium salt.

This salt, 6.0 g., was added at −8° C. to a solution of 2.1 ml. of ethyl chloroformate and two drops of dimethylbenzylamine in 70 ml. of acetone. The mixture was stirred at −5 to −8° C. for 20 minutes, yielding a solution of the mixed anhydride.

A solution of 7-aminocephalosporanic acid, 6.3 g., in 30 ml. of water was adjusted with triethylamine to pH 7.5, then diluted with 30 ml. of acetone. The resulting solution was added to the mixed anhydride solution and the mixture was stirred at 0° C. for one hour. The reaction product mixture was filtered to remove a small amount (~1.0 g.) of insoluble material, which was subsequently discarded, and the filtrate was concentrated in vacuo to remove the acetone. The aqueous residue phase was overlayered with 75 ml. of methyl isobutyl ketone. Formic acid, 10 ml., was added and the mixture shaken vigorously and filtered. The two-layered filtrate was stirred vigorously at ambient temperature for 15 minutes and then cooled to about 0° C. for 12 hours. The resulting crystalline solid, 7-(α-D-aminophenylacetamido)cephalosporanic acid, was collected, washed with 20 ml. of 1:1 water-methyl isobutyl ketone, and vacuum-dried. Yield: 2.2 g. (23 percent).

EXAMPLE 4

To a solution of 22.4 g. of potassium hydroxide pellets (85 percent) in 1.2 liters of anhydrous ethanol were added 60.4 g. (0.4 mole) of D-phenylglycine. With stirring, 43.2 ml. of methyl acetoacetate were added. The mixture was stirred and refluxed for 2.5 hours. The hot solution was filtered from the insoluble material, which was subsequently discarded. The filtrate was refrigerated and the resulting solid potassium N-(1-methoxycarboxyl-1-propen-2-yl) α-aminophenylacetate was collected, washed with anhydrous ethanol, and vacuum-dried at 60° C. Yield: 70 g. (61 percent).

To 70 ml. of acetone at −8° C. were added, in order, 2.1 ml. of ethyl chloroformate, 3 drops of dimethylbenzylamine, and 6.35 g. of the potassium salt prepared above. The mixture was stirred for 20 minutes at −5 to −8° C.

A solution of 7-aminocephalosporanic acid, 6.3 g., prepared as in Example 3, was added, and the further reaction and product recovery steps were carried out according to the same procedure and under the same conditions as in Example 3.

We claim:

1. A process for the preparation of an antibiotic substance of the formula:

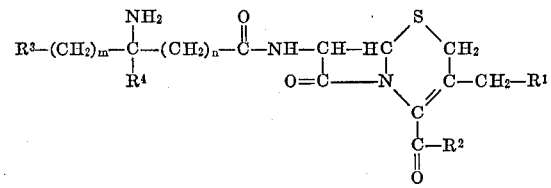

wherein:

$R^1$ is a member of the group consisting of acetoxy and pyridino;

$R^2$ is OH when $R^1$ is acetoxy;

$R^2$ is O− when $R^1$ is pyridino;

$R^3$ is a member of the group consisting of $C_1$–$C_4$ alkyl, phenyl, naphthyl, indolyl, and pyridyl;

$R^4$ is a member of the group consisting of hydrogen, methyl, and ethyl; and $m$ and $n$ are members of the group consisting of 0 and 1;

which comprises reacting an N-protected amino acid of the formula:

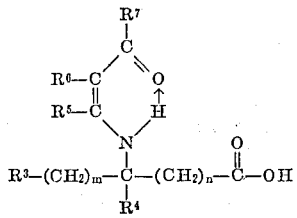

wherein $R^3$, $R^4$, $m$, and $n$ are as hereinabove defined;

$R^5$, when taken alone, is a member of the group consisting of hydrogen, lower alkyl, and phenyl;

$R^6$, when taken alone, is a member of the group consisting of hydrogen, lower alkyl, phenyl-substituted lower alkyl, and phenyl;

$R^7$, when taken alone, is a member of the group consisting of hydrogen, lower alkyl, lower alkoxy, and phenyl;

$R^6$ and $R^7$, when taken together with the carbon atoms to which they are attached, complete a carbocyclic ring having the structure of the group consisting of benzene and naphthalene; and $R^5$ and $R^7$, when taken together with the interconnecting carbon atoms, complete a $C_5$–$C_7$ cycloaliphatic ring;

with a cephalosporin nucleus represented by the formula:

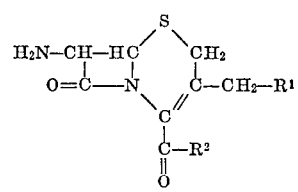

wherein $R^1$ and $R^2$ are as hereinabove defined, then acidifying the reaction product mixture to below pH 5, and recovering therefrom the desired derivative of cephalosporanic acid.

2. A process as defined in claim 6 wherein said N-protected amino acid is reacted with about an equimolar proportion of said cephalosporin nucleus in the presence of at least about an equimolar proportion of a carbodiimide.

3. A process as defined in claim 6 wherein said N-protected amino acid, in the form of its salt with a cation of the group consisting of tertiary amines and alkali metals in cationic form, is reacted with an alkyl chlorocarbonate, and the resulting mixed anhydride is reacted with said cephalosporin nucleus.

4. A process as defined in claim 3 wherein said N-protected amino acid in the form of its alkali metal salt is reacted with an alkyl chlorocarbonate, in a nonaqueous water-soluble solvent, in the presence of a tertiary amine; and the resulting mixed anhydride is commingled with an aqueous solution of said cephalosporin nucleus.

5. A process for the preparation of an antibiotic substance of the formula

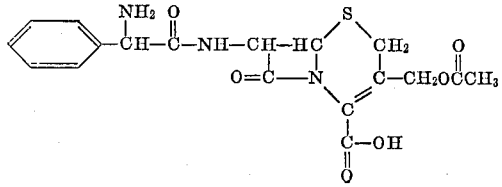

which comprises reacting an N-protected amino acid of the formula

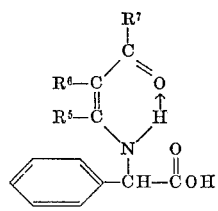

wherein:

$R_5$ is a member of the group consisting of hydrogen, lower alkyl, and phenyl;

$R_6$ is a member of the group consisting of hydrogen, lower alkyl, phenyl-substituted lower alkyl, and phenyl;

$R_7$ is a member of the group consisting of hydrogen, lower alkyl, lower alkoxy, and phenyl;

with 7-aminocephalosporanic acid, then acidifying the reaction product mixture to below pH 5, and recovering therefrom said antibiotic substance.

6. A compound of the formula

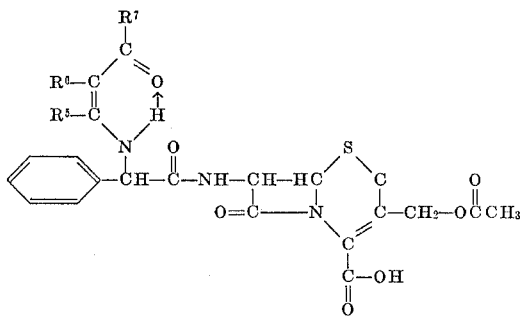

wherein:

$R_5$ is a member of the group consisting of hydrogen, lower alkyl, and phenyl;

$R_6$ is a member of the group consisting of hydrogen, lower alkyl, phenyl-substituted lower alkyl, and phenyl;

$R_7$ is a member of the group consisting of hydrogen, lower alkyl, lower alkoxy, and phenyl.

7. A compound as in claim 6, said compound being 7 - (α - N - [2 - (4 - keto - 2 - pentenyl)]aminophenylacetamido)cephalosporanic acid.

8. A compound as in claim 6, said compound being 7 - (D - α - N - [2 - (4 - keto - 2 - pentenyl)]aminophenylacetamido)cephalosporanic acid.

9. A compound as in claim 6, said compound being 7 - (N - (1 - methoxycarbonyl - 1 - propen - 2 - yl)-phenylglycylamido)cephalosporanic acid.

10. A compound as in claim 6, said compound being 7 - (N - (1 - methoxycarbonyl - 1 - propen - 2 - yl)-D-phenylglycylamido)-cephalosporanic acid.

References Cited

UNITED STATES PATENTS 3,252,973    5/1966    Flynn.
3,373,155    3/1968    Ekström et al.

OTHER REFERENCES

Dane et al.: Angew. Chem., 76, 342 (1964).

NICHOLAS S. RIZZO, Primary Examiner